United States Patent [19] [11] 4,222,645
Imura et al. [45] Sep. 16, 1980

[54] CAMERA SHUTTER RELEASE DEVICE

[75] Inventors: Toshinori Imura, Sakai; Harumi Tanaka, Kobe, both of Japan

[73] Assignee: Minolta Camera Kabushiki Kaisha, Osaka, Japan

[21] Appl. No.: 894,393

[22] Filed: Apr. 7, 1978

[30] Foreign Application Priority Data

Apr. 21, 1977 [JP] Japan .................................. 52-46485

[51] Int. Cl.³ .......................... G03B 7/08; G03B 17/40
[52] U.S. Cl. ...................................... 354/51; 354/238; 354/239; 354/266
[58] Field of Search ..................... 354/38, 48, 50, 51, 354/234, 235, 237–240, 266, 267, 73, 66, 149

[56] References Cited
U.S. PATENT DOCUMENTS

| T961,005 | 8/1977 | Deffenbaugh | 354/238 |
| 3,049,983 | 8/1962 | Schulze | 354/38 |
| 3,733,991 | 5/1973 | Kobayashi et al. | 354/230 |
| 3,820,131 | 6/1974 | Tanaka | 354/50 X |
| 3,945,026 | 3/1976 | Hayami | 354/239 X |
| 3,978,496 | 8/1976 | Matsumoto | 354/149 X |
| 4,001,843 | 1/1977 | Ellin | 354/51 X |
| 4,021,825 | 5/1977 | McCann et al. | 354/238 X |
| 4,107,705 | 8/1978 | Hashimoto et al. | 354/138 X |

Primary Examiner—L. T. Hix
Assistant Examiner—William B. Perkey
Attorney, Agent, or Firm—Watson, Cole, Grindle & Watson

[57] ABSTRACT

In a shutter release device adapted for use with a photograpic camera, especially of the compact or miniature type, delay means are selectively actuated in accordance with a set or anticipated shutter speed for delaying or retarding the initiation of actual shutter opening. The shutter opening is commenced after a lapse of time from the manual operation of the shutter release button to the operation of the shutter release member, when the scene brightness is so low that a blurred picture is anticipated. The shutter is actuated immediately after operation of the release member when the scene brightness is high enough. The delay means may be a mechanical governor of an electric delay circuit responsive to shutter speed setting or detection of scene brightness.

15 Claims, 6 Drawing Figures

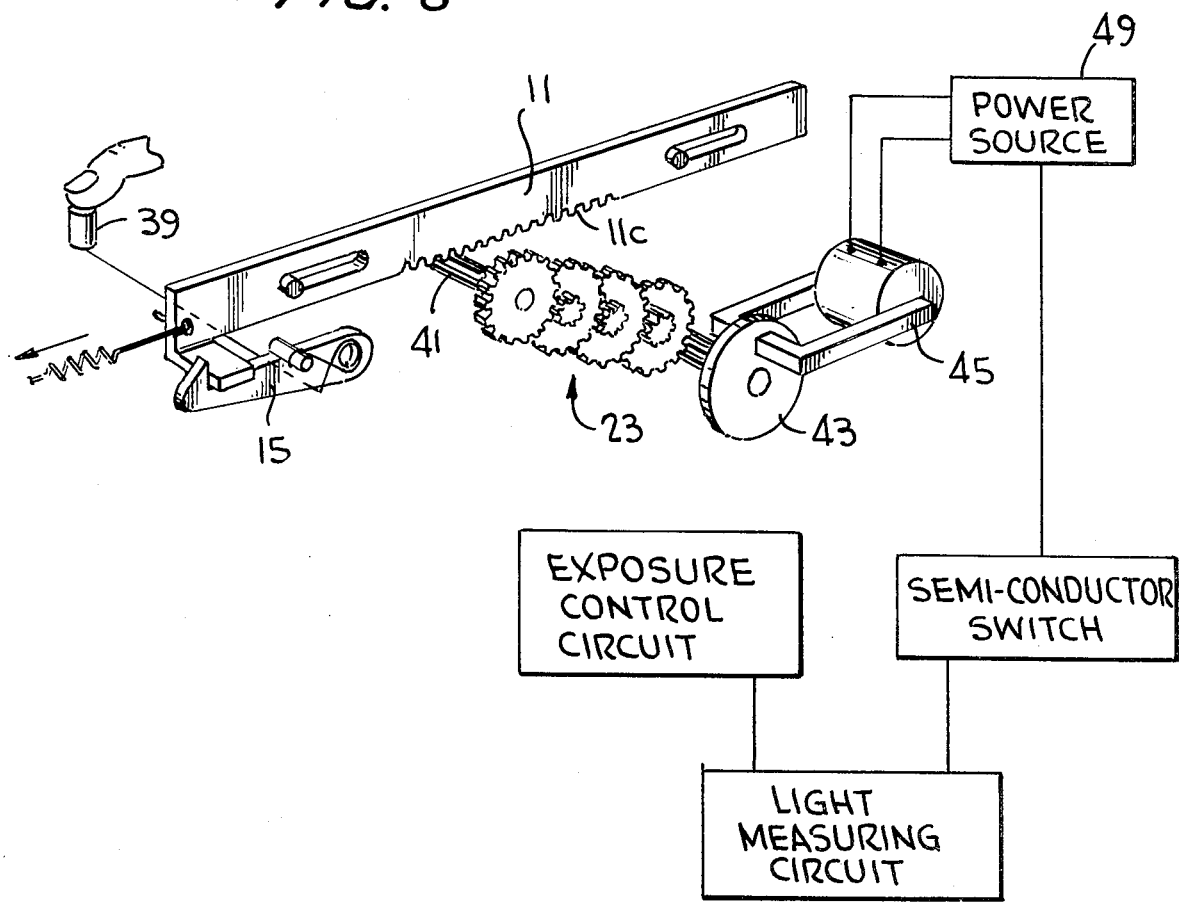

CAMERA SHUTTER RELEASE DEVICE

BACKGROUND OF THE INVENTION

Field of the Invention

The present invention relates to a shutter release device for use in a camera, and more particularly to a shutter release device effective for compact or miniature cameras to delay operation of the actual shutter opening.

SUMMARY OF THE INVENTION

Generally, in a camera, when a manually operable shutter release mechanism, e.g. a shutter release button, is depressed, the depressing force may be transmitted to the camera body, thereby occasionally moving it, and producing a blurred picture. In a compact camera, e.g. for which the 110 size film of Eastman Kodak Company is used, such blurred pictures are liable to be taken even at normal shutter speeds, e.g. 1/30 and 1/60 second, when pictures are taken with a hand-held camera. Of course, in such a compact camera, a blurred picture rarely occurs at faster shutter speeds, say, not slower than 1/125 of a second.

Accordingly, the primary object of the present invention is to provide a shutter release device in which a blurred picture prevention device operates at those shutter speeds at which a blurred picture is likely to occur.

The blurred picture prevention device according to the present invention is constructed such that the shutter opening operation may be initiated after a lapse of a given time period following the completion of the manual operation of a member for shutter release, i.e. when the motion of the camera body caused by the manually operable member has stopped.

According to the present invention, when the shutter speed to be carried out by mechanical or electrical means in accordance with a manual setting, or the output of a light measuring circuit, is so slow that a blurred picture is anticipated, the shutter opening may be initiated some time after manual operation of the shutter release member has been completed such that the motion of the camera body, caused by the shutter release operation, has settled, thereby lessening the occurrence of blurred pictures. Conversely, when the aforesaid shutter speed is sufficiently fast, the shutter opening operation may be initiated simultaneously with the shutter release operation.

BRIEF DESCRIPTION OF THE DRAWINGS

The structure and operation of the invention, as well as the above-stated advantages and features thereof, are apparent from the description taken in conjunction with the following drawings, wherein:

FIG. 6 is a combined block diagram and schematic illustration of another embodiment of the invention.

DETAILED DESCRIPTION OF THE PREFERRED EMBODIMENTS

Figure 1:
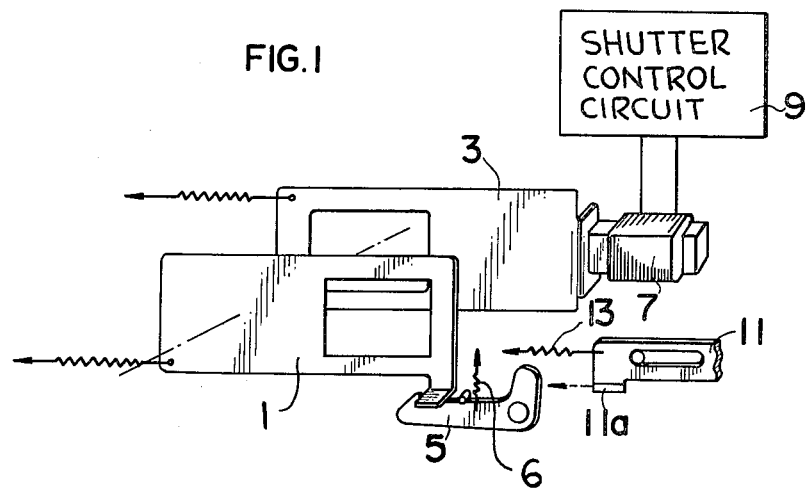
FIGS. 1 through 3 are schematic views of the essential parts of the apparatus according to the embodiments of the present invention.
Figure 2:
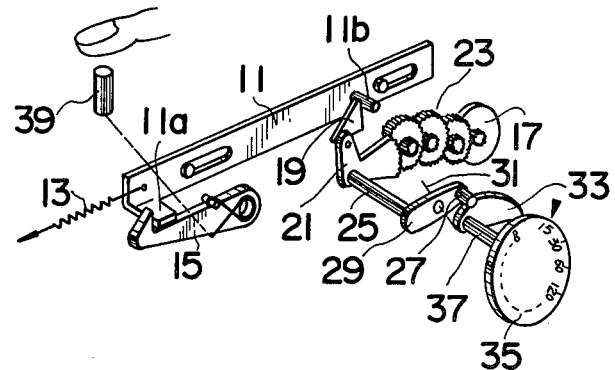

Referring to FIGS. 1 and 2, which show a first preferred embodiment according to the present invention, members 1 and 3, both biased to the left by springs, are the leading and trailing shutter plates which form a Guillotine shutter. When the shutter is charged, or is in the cocked position as in FIG. 1, leading shutter plate 1 is restrained by restraining lever 5 which is biased clockwise by a spring 6, and retains the trailing shutter plate 3 in a charged position by a well-known means (not shown). Electromagnet 7 holds trailing shutter plate 3 in the charged postion, which may be released in accordance with timing that is controlled by shutter control circuit 9. Operating plate 11 is driven leftward by spring 13 to rotate restraining lever 5 counterclockwise through engagement with projection 11a thereof to thereby release leading shutter plate 3, thus initiating opening of the shutter.

As shown in FIG. 2, operating plate 11 is restrained by release lever 15 while the shutter is in the cocked position, and it is slidable in the horizontal direction through the coupling of the guide pins and slots formed therein. Flywheel 17 is connected to the terminal cog of a gear train, the other end of which is coupled to sector gear 21 on which is pivoted contact plate 19 engageable with pin 11b carried by operating plate 11. The gear train forms a governor mechanism 23 along with flywheel 17 and sector 21. Sector 21 is pivoted on rod 25 which is fixed to linking lever 29 to which pin 27 is fixed. Linking lever 29 is rotatable about axis 31, and biased by a spring (not shown) so that pin 27 bears against cam plate 33. Shutter speed setting dial 35 is rotatable to determine the value of a variable resistance for shutter speed settings in shutter control circuit 9. Shutter speed setting dial 35 is connected with the cam plate 33 through rod 37. Governor mechanism 23 is constructed with the axles of the gear train and flywheel mounted on a base plate (not shown) which rotates in response to the rotation of linking lever 29 so that contact plate 19 is brought into the locus of movement of pin 11b to abut it when shutter speed setting dial 35 is set to a shutter speed less than a predetermined value, e.g. 1/60 of a second. Contact plate 19 retracts from the moving path of pin 11b when dial 35 is set to a faster shutter speed than the aforesaid predetermined value.

Accordingly, when the shutter speed is set lower than the predetermined value, depression of shutter release button 39 causes release lever 15 to rotate counterclockwise, thereby allowing operating plate 11 to move leftwardly by the force of spring 13. At this time pin 11b abuts contact plate 19, and operating plate 11 moves slowly to the left, being governed by governor mechanism 23, and reaches a position to rotate restraining lever 5 counterclockwise through bent portion 11a when the motion of the camera body (not shown) has come to rest following the completion of the shutter release button 39 operation. Thereby, the restraint on the leading shutter plate 1 is released to initiate the opening of the shutter. When the given time, preset by shutter speed setting dial 35, has passed after shutter opening operation, the electromagnet 7 is deenergized or energized (in accordance with camera design) to release trailing shutter plate 3 from its held position for shutter closing operation.

But, when the shutter speed is set higher than the predetermined value, contact plate 19 remains retracted from the moving path of pin 11b, and operating plate 11, a short time after being released from its restrained position, releases the restraint of leading shutter plate 1 to initiate the opening of the shutter. It should be understood that the above type of construction may also apply to a mechanically controlled shutter and that an anchor type mechanism may be used in place of flywheel 17.

Figure 3:
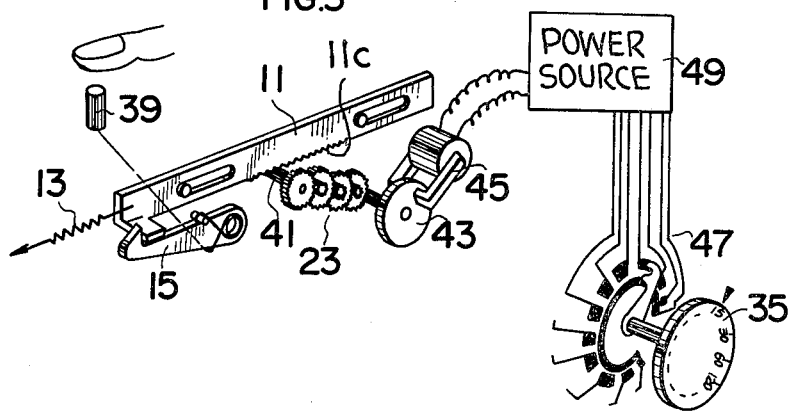

FIG. 3 shows a modification of the first preferred embodiment shown in FIG. 2. In FIG. 3 the same reference numerals are used for like members, or corresponding to that of FIG. 2. Referring to FIG. 3, rack 11c is formed on operating plate 11, and is engaged by pinion 41 linked with the gear train of governor mechanism 23. Flywheel 43 is linked with the gear train and electromagnet 45 governs the flywheel by its attractive force when energized, and is connected to power source 49 through switch 47 which is closed and opened in response to the set positions of shutter speed setting dial 35. Electromagnet 45 is energized when the shutter speed is set to values lower than a predetermined value, but remains unenergized when set to higher values than a predetermined value, whereby the shutter opening operation is initiated after the lapse of a given time following the completion of operation of the shutter release button 39 at slower shutter speeds.

In the embodiment of FIG. 6, a semiconductor switch may be connected to the power source in place of switch 47, and may be turned on and off in response to the output of a light measuring circuit to control electromagnet 45 which will or will not govern the flywheel of the governor mechanism in accordance with the shutter speed to be automatically set in accordance with the scene brightness.

Figure 4:
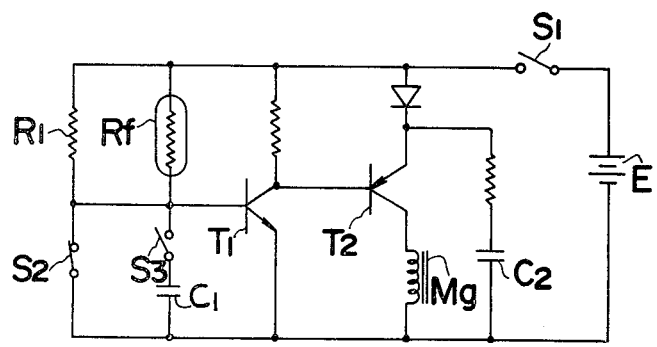
FIGS. 4 and 5 are circuit diagrams of preferred embodiments according to the present invention.

FIG. 4 is another embodiment of the present invention in which the initiation of the shutter operation is retarded electrically. Referring to FIG. 4, integrating capacitor C1 is connected through switch S3 serially with photoconductive element Rf to form a delay circuit, and fixed resistor R1 is connected in parallel with photoconductive element Rf. Trigger switch S2 is opened in response to the depression of the shutter release button. Trigger switch S2, when closed, short-circuits integrating capacitor C1, and when opened it allows integrating capacitor C1 to be charged. One end of capacitor C1 is connected to the base of transistor T1, which forms a semiconductor switching circuit together with transistor T2 whose collector is coupled with electromagnet Mg adapted to initiate the shutter opening operation. Power supply capacitor C2 for the energization of electromagnet Mg may be connected to power source E through a diode to be charged. Power source switch S1 is closed in conjunction with the depression of the shutter release button. The circuit constant in the integrating circuit including fixed resistor R1, photoconductive element Rf and integrating capacitor C1, and the trigger level of transistor T1 are selected so that when a scene brightness is so low as to provide a shutter speed that may cause a blurred picture with a hand-held camera (without any blurred picture prevention means as in the present invention), transistor T1 is turned on after completion of the shutter release button operation.

According to the above construction, in case the scene brightness is high enough and a shutter speed higher than that which would cause a blurr is anticipated, upon depression of the shutter release button to close power switch S1 and open trigger switch S2 with switch S3 being closed previously, integrating capacitor C1 is charged quickly so that transistors T1 and T2 are turned on at an earlier time to energize electromagnet Mg with a current discharged from power supply capacitor C2 through the emitter-collector of transistor T2 to thereby initiate shutter opening.

However, when the scene brightness is insufficient, the resistance of photoconductive element Rf is sufficiently high so that the time constant of the delay circuit depends substantially upon the resistance value of fixed resistor R1. As a result, transistors T1 and T2 are turned on some time after the completion of the shutter release button depressing operation.

When it is desired that the initiation of the shutter opening operation is effected immediately after the shutter release button operation at a slower shutter speed, switch S3 is opened to allow the power source voltage to be applied through fixed resistor R1 to the base of transistor T1 upon opening of trigger switch S2, thereby immediately turning on transistors T1 and T2.

Figure 5:
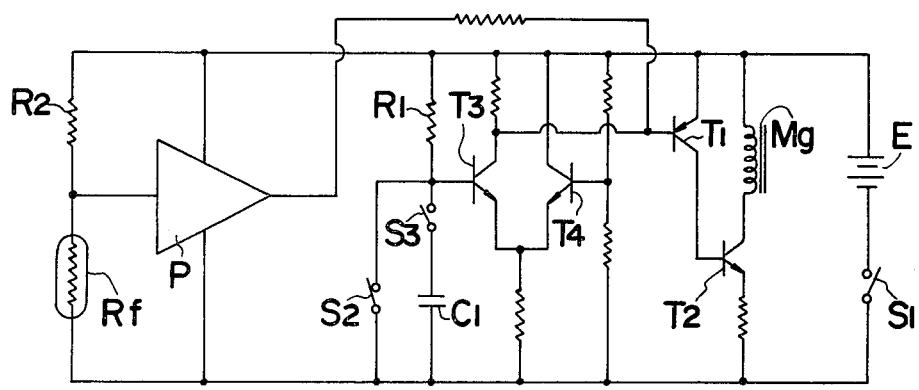

FIG. 5 shows still another embodiment of the present invention in which an electrical means is employed for timing shutter initiation. The same reference symbols are used for the circuit elements corresponding to those of FIG. 4. Referring to FIG. 5, the coil of electromagnet Mg, which is used to initiate the shutter opening operation when energized, is connected to power source E through a first semiconductor switch circuit consisting of two transistors T1 and T2 and power source switch S1, which is closed in response to the shutter release button depressing operation. The base of transistor T1 is connected to the output terminal of the second semiconductor switch circuit P, which is controlled by a voltage divider including fixed resistor R2 and photoconductive element Rf. The circuit constant is selected such that transistors T1 and T2 may be turned on when the scene brightness is higher than the predetermined value.

The output terminal of differential amplifiers T3 and T4, the switching on and off operation of which is controlled by the delay circuit comprising fixed resistor R1 and integrating capacitor C1 connected in series with the resistor through switch S3, is connected to the base of transistor T1, so that transistors T1 and T2 may be turned on after the lapse of a given delay time following the opening of the trigger switch. As a result, the turning on time of the first semiconductor switch circuit (T1 and T2) i.e. the initiating time for the shutter opening operation by the energization of electromagnet Mg, is controlled by the delay circuit (R1 and C1), when the scene brightness is so insufficient that it may cause the shutter speed to be less than the predetermined value. The first semiconductor switch circuit may be turned on simultaneously with, or immediately after, the opening of power source switch S1 when the scene brightness is sufficient.

It is to be understood that in the above embodiments shown in FIGS. 4 and 5, switch S3 is opened and closed in relation to the set position of a manual shutter setting member as shown in FIG. 3. Alternatively, another switch having such operation may be provided to control the turning on and off operation of the first semiconductor switch circuit (T1 and T2).

What is claimed is:

1. A shutter release device for cameras comprising:
   manually operable means for actuating the shutter release device;
   means for initiating shutter opening in response to the operation of said manually operable means;
   delay means for controlling said initiating means to cause the initiation of the shutter opening after lapse of a delay time sufficient to enable movement of the camera to be stabilized subsequent to the operation of said manually operable means to prevent a blurred photograph induced by camera movement; and control means for selectively actuating said delay means with the shutter speed slower than a predetermined value at which a blurred photograph is anticipated.

2. A shutter release device as in claim 1 wherein said control means includes a shutter speed setting member and means for making said delay means operative when said shutter speed setting member is set to a position of the shutter speed slower than said predetermined value.

3. A shutter release device as in claim 1 wherein said camera includes light detecting means for detecting scene light, and said control means includes a control circuit responsive to the output of said light detecting means to make the delay means effective when the scene light is lower than a predetermined level.

4. A shutter release device as in claim 3 wherein said camera includes electromagnetic means for initiating shutter operation, and said delay means includes a delay circuit for delaying the actuation of said electromagnetic means.

5. A shutter release device as in claim 4 further comprising a first switch means responsive to the operation of said manually operable means, means for actuating said electromagnetic means in response to the operation of said first switch means, said delay circuit being connected between said first switch and said means for actuating said electromagnetic means.

6. A shutter release device as in claim 5 wherein said delay circuit includes a photocell operable as said control means and said light detecting means, whereby the delay time established by the delay circuit depends on scene light.

7. A shutter release device as in claim 5 further comprising a second switch means responsive to the output of said light detecting means.

8. A shutter release device as in claim 1 wherein said camera includes light detecting means for detecting scene light, and means for controlling shutter speed in accordance with the output of said light detecting means, and said control means includes a control circuit responsive to the output of said light detecting means to make the delay means effective when the scene light is lower than a predetermined level.

9. A shutter release device for a photographic camera including a shutter opening member for initiating exposure and a restraining member for restraining the shutter opening member at the cocked position thereof, said release device comprising:

an operating member movable from a cocked position to an operating position for releasing the restraint on said shutter opening member;

driving means for driving said operating member from the cocked to the operating position thereof;

a lock member for locking said operating member at the cocked position thereof;

a manually operable member for releasing said operating member;

retard means for retarding arrival of said operating member to the operating position thereof to enable camera movement to stabilize subsequent to operation of said manually operable member; and control means for selectively actuating said retard means with the shutter speed slower than a predetermined value at which a blurred photograph can be anticipated.

10. A shutter release device as in claim 9 wherein said control means includes a shutter speed setting member and means for making said retard means operative when said shutter speed setting member is set to a position of the shutter speed slower than said predetermined value.

11. A shutter release device as in claim 9 wherein said retard means includes a mechanical governor.

12. A shutter release device as in claim 11 wherein said control means includes a shutter speed setting member and means for bringing said mechanical governor into engagement with said operating member with the set position of said shutter speed setting member slower than a predetermined value and for preventing said mechanical governor from engagement with said operating member with said set shutter speed faster than said predetermined value.

13. A shutter release device as in claim 9 wherein said control means includes a shutter speed setting member and said retard means includes an electromagnetic means for controlling the speed of movement of said operating member from the cocked to the operating position, said control means further includes switch means for selectively actuating said electromagnetic means in accordance with the set position of said shutter speed setting member.

14. A shutter release device for a photographic camera comprising:

electromagnetic means for initiating shutter opening operation;

first switch means for actuating said electromagnetic means;

second switch means manually operable for actuating said first switch means;

delay means for delaying the actuation of said first switch means for a period of time sufficient to enable movement of the camera to be stabilized after the manual operation of said second switch means to prevent a blurred photograph induced by camera movement;

detecting means for detecting scene light; and control means for selectively overriding said delay means with the scene light detected by said detecting means at a level at which movement of the camera does not cause a blurred photograph.

15. A shutter release device as in claim 14 wherein said delay means includes a capacitor, and a photoelectric means as said detecting means, said photoelectric means being coupled with said capacitor to charge the latter with a current commensurate with the scene light.

* * * * *